United States Patent [19]

Shelbourne et al.

[11] Patent Number: 5,678,397
[45] Date of Patent: Oct. 21, 1997

[54] HARVESTING APPARATUS

[75] Inventors: Keith H. Shelbourne; Paul John McCredie, both of Ipswich, England

[73] Assignee: Shelbourne Reynolds Engineering Ltd., Suffolk, England

[21] Appl. No.: 422,488

[22] Filed: Apr. 12, 1995

[30] Foreign Application Priority Data

Apr. 15, 1994 [GB] United Kingdom ............... 9407519

[51] Int. Cl.⁶ .................................................. A01D 34/00
[52] U.S. Cl. ........................... 56/14.6; 56/16.4; 460/94
[58] Field of Search ........................... 56/14.6, 16.4, 56/128, 369, 126, 130; 460/91, 93, 94, 104

[56] References Cited

U.S. PATENT DOCUMENTS

| 563,078 | 6/1896 | Shaw et al. | 56/130 |
|---|---|---|---|
| 3,939,847 | 2/1976 | Straeter | 56/14.6 X |
| 4,077,192 | 3/1978 | Klinner et al. | 56/16.4 R |
| 4,373,537 | 2/1983 | McNaught | 56/16.4 R X |
| 4,587,799 | 5/1986 | Thomas et al. | 56/14.6 |
| 4,843,806 | 7/1989 | Klinner | 56/364 |
| 4,991,385 | 2/1991 | Klinner | 56/364 |
| 5,044,147 | 9/1991 | Klinner | 56/14.6 |
| 5,111,645 | 5/1992 | Klinner | 56/364 |
| 5,466,190 | 11/1995 | Skinner et al. | 460/94 X |

FOREIGN PATENT DOCUMENTS

| 181500 | 5/1986 | European Pat. Off. | 56/14.6 |
|---|---|---|---|
| 0 241 276 A1 | 10/1987 | European Pat. Off. | |
| 1122263 | 11/1984 | U.S.S.R. | 56/1.6 |

*Primary Examiner*—Terry Lee Melius
*Assistant Examiner*—Thomas A. Beach
*Attorney, Agent, or Firm*—Dennis T. Griggs

[57] ABSTRACT

A crop stripper has a moving shaker pan between the stripper drum and an auger receiving the gathered crop parts from the drum. The pan has a conveying platform arranged in a series of descending steps from the stripper drum to the auger. It is constrained to oscillate in a manner in which the front end has both horizontal and vertical components of movement whereas the rear end moves along a small downwards incline. It is found that these features help to promote the rearward movement of crop parts such as grain, so reducing spillage in the space between the stripper drum and the auger.

10 Claims, 2 Drawing Sheets

HARVESTING APPARATUS

BACKGROUND OF THE INVENTION

This invention relates to harvesting apparatus for gathering crop parts from a standing crop. It is particularly concerned, although not necessarily exclusively so, with crop strippers which comprise a stripping rotor for removing the crop parts to be harvested from a standing crop in order to discharge the gathered parts rearwards to an auger rotating in the opposite direction which conveys the stripped crop onwards, e.g. to transfer it to a hopper.

Crop strippers are conventionally used to harvest plant parts such as seed from the stems of the crop. Because there is always a risk of some of the stems being broken or torn from the ground and drawn into the machine, it is necessary to space the stripping drum and the auger sufficiently far apart to prevent these stems tangling themselves between the two rotary devices and so hindering their operation. Conventionally, a conveyor belt runs between the drum and the auger to prevent stripped crop parts falling to the ground in the space between them and to keep any material collected on it moving towards the auger.

The conveyor belt and its drive add considerably to the cost of the apparatus. In addition the belt can be prone to wear, increasing the down time for maintenance. It would be desirable to omit the conveyor belt but, as indicated, greater problems can arise if the stripper drum and auger are simply moved closer together.

It has been proposed (EP 241276) to place a pan providing a horizontal platform in the gap between the drum and auger, the platform being given a saw-tooth profile with alternating rearwardly and forwardly inclined surfaces. The pan is oscillated on a parallel motion linkage with the intention that the surfaces of the saw tooth profile give material on the pan a rearward movement towards the auger. The arrangement disclosed in this earlier publication is, however, unable to convey the crop parts in the required manner.

SUMMARY OF THE INVENTION

In the harvesting machine of the present invention, crop parts are gathered from a standing crop by a stripper or other gathering means and are conveyed to an auger by a pan or platform or other transfer means having a conveying surface which is lower at a trailing, auger end than at an opposite, leading end. A rocking lever or other oscillating means is coupled to the pan or platform for oscillating the conveying surface of the pan or platform to drive the gathered crop parts rearwardly towards the auger.

Preferably, the oscillation means comprises a mechanism arranged to produce a horizontal component of movement towards and away from a lower region of the auger and a vertical component of movement which is greater at the leading region of the pan than at its trailing region. It may be arranged that there is only a minor downwards and rearwards movement at the trailing edge, or even that there is essentially no vertical component of movement at the trailing region. In either case, preferably there is substantially no movement transverse to the extent of the conveying surface in that region.

It is also preferred to arrange the conveying surface of the pan in a stepped form composed of a series of substantially horizontal faces alternating with downwardly extending faces which are directed rearwards.

In a further preferred feature, the trailing end of the transfer means pan overlaps an auger pan extending rearwardly thereof under the auger and is located above the floor of the auger pan. Sealing means are provided between the underside of overlapping trailing end of the transfer means pan and the front end of the auger pan. These sealing means may comprise a sliding seal or a flexible diaphragm secured to the transfer means pan and the auger pan.

The invention will be described in more detail by way of example with reference to the accompanying drawings.

DESCRIPTION OF THE PREFERRED EMBODIMENT

Figure 1:
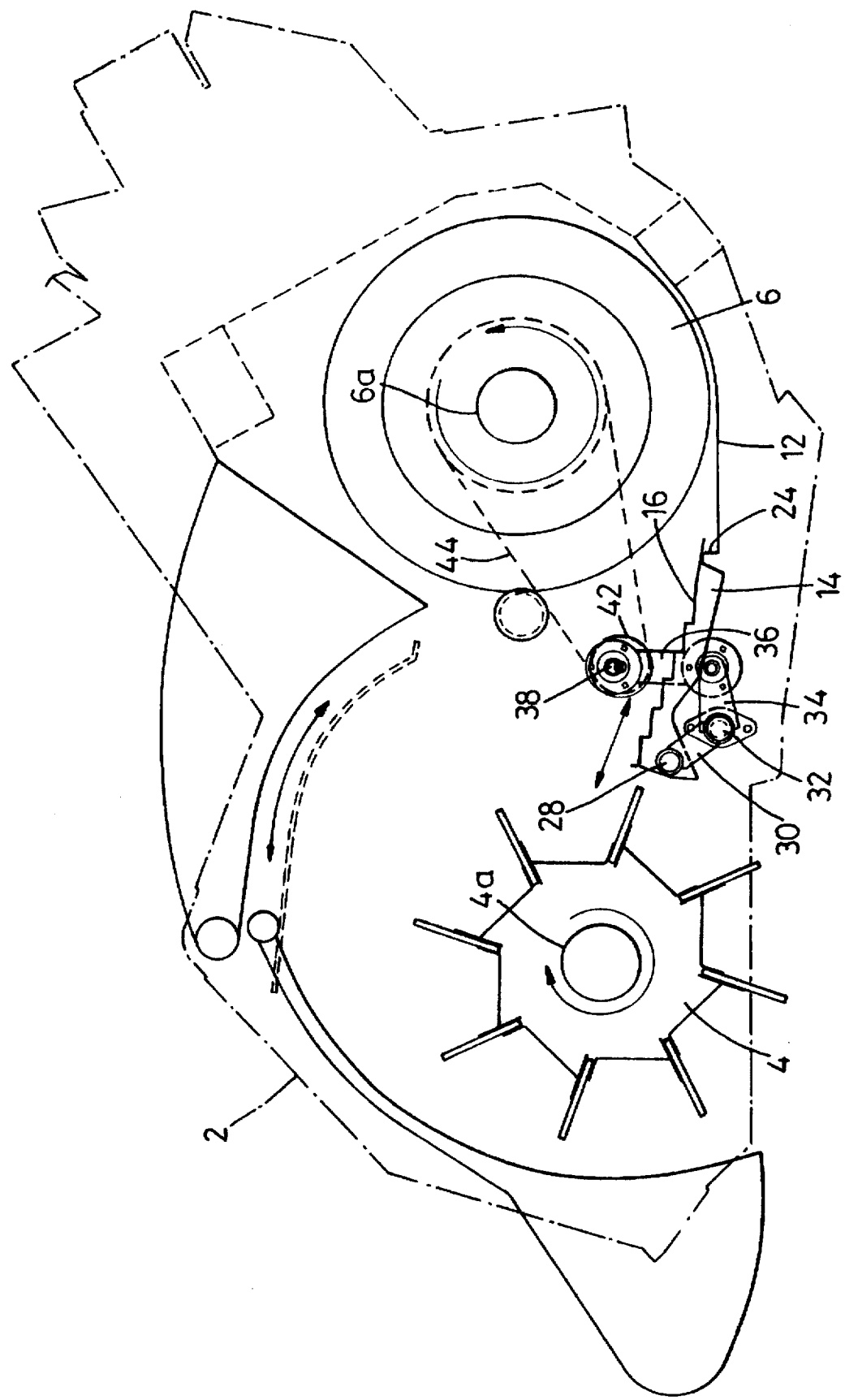
FIG. 1 is a schematic side view of a crop stripper provided with a transfer means in accordance with the invention.

In the drawing, the stripper casing 2 encloses a stripping drum 4 towards a forward end of the casing and an auger 6 at its rearward end, mounted on respective fixed rotary axes 4a,6a and being at a spacing from each other. The casing is open below the drum 4 so that, in conventional manner, the teeth on the drum can enter the crop as the stripper advances into the crop with the drum rotating, to remove the parts intended to be harvested. These crop parts are swept over the drum towards the auger 6 to be transported onwards. The space below the auger is closed by a closely spaced, fixed pan 12. Between the drum and auger there extends an oscillating transfer pan or platform 14 to prevent stripped crop parts dropping behind the drum 4 from falling to the ground and to convey them rearwards to the auger.

Figure 2:
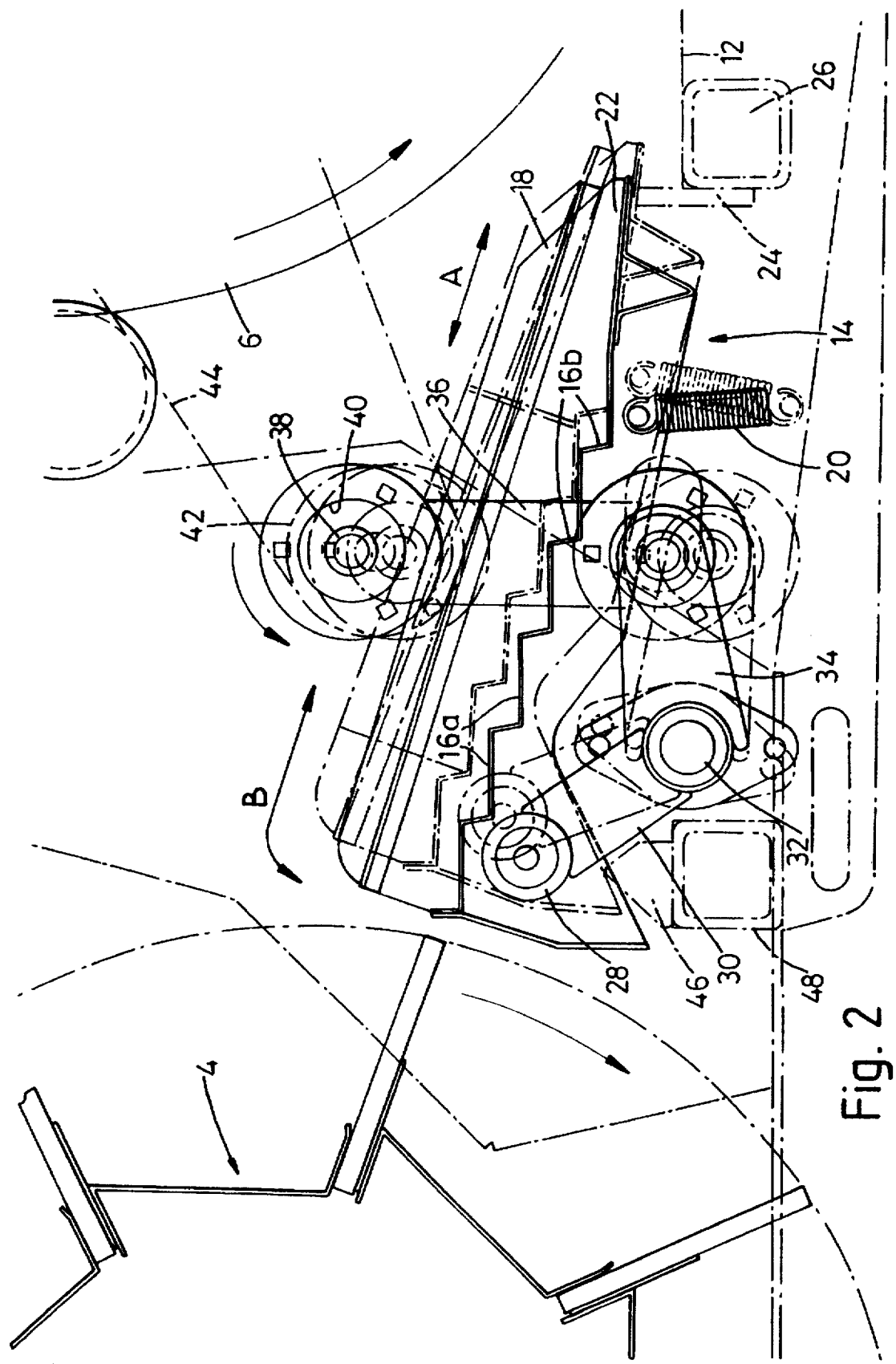
FIG. 2 is a side view similar to FIG. 1 but to a larger scale and showing more detail.

The transfer pan 14 comprises a progressively downwardly extending surface 16 that leads onto the fixed pan 12 below the auger. The surface extends across the width of the stripper casing and descends from front to rear in a series of steps comprising substantially horizontal flat faces 16a (FIG. 2) alternating with almost vertical downwardly extending faces 16b. Plates 18 at opposite sides of the pan form side walls projecting above the surface to prevent sideways spillage of the crop from the pan.

At the rear region of the pan, springs 20 are connected between the stripper casing and dependent flanges 22 on opposite sides of the pan. The springs 20 draw the rear end of the platform against a sealing bar 24 fixed to cross-beam 26 of the casing. At its forward region, the pan flanges 22 have pivots 28 attached to first lever arms 30 which are mounted on an oscillatory shaft 32 held in fixed bearings in the casing side walls. Further lever arms 34 project from the shaft to be journalled to the lower end of connecting rods 36, each of which has its upper end fixed to an eccentric roller 38 that orbits around a circular track 40 fixed relative to the casing. The eccentric rollers rotate with a drive wheel 42 conveniently driven by chain 44 from the main drive (not shown) for the stripper drum and auger.

Movement of the eccentric rollers 38 around the tracks 40 causes the connecting rod 36 to oscillate the shaft 32. The oscillation is transmitted to the transfer pan 16 through the pivot 28 but the pan is also constrained by the springs 20 and abutting sealing bar 22 so that, while the pan moves forwards and rearwards as a whole, the vertical component of the movement at the pivot 28 is not transmitted to the rear portion of the pan. The rear of the pan thus performs a generally horizontal oscillation, inclined at a small angle downwards and rearwards as indicated by the arrows A.

The first lever arms 30 are inclined upwards and forwards, towards the stripping drum 4, so that the oscillation of the shaft 32 causes the front of the pan 16 to move approximately tangentially to the envelope of the path swept by the stripping teeth on the drum, passing close to the front of the pan. The motion of the front region of the pan is indicated by the arrows B in FIG. 2 which also shows the shaker pan in opposite end positions in full and broken lines respectively. As a fail-safe provision, a bottom stop 46 for the pan motion is mounted on forward cross-beam 48.

The different motions of the front and rear regions of the pan mean that the pan can be located close to both the stripper drum and the auger while providing an upward and rearward motion to the material filling on the front region to move it quickly away from the stripper drum.

There is less risk of spillage of separated crop parts at the front of the pan, therefore, and at the rear the material is removed more quickly by the auger so preventing a build up that might spill over the sides of the transfer pan.

At the region between the transfer pan 16 and the auger pan 12, the sealing bar 24 prevents spillage of the crop parts between the transfer pan 16 and the auger pan 12. The bar is a renewal plastics strip that provides a sliding seal between the two pans 16,12.

It is found that the inclination of the transfer pan assists the movement of the crop parts towards the auger. This movement is also promoted by the fact that it is possible to impart a relatively vigorous shaking motion, including a substantial vertical component, in the forward region of the transfer pan without producing widely varying gaps between the pan and the stripping drum and/or auger at different points of the oscillatory cycle.

We claim:

1. A harvesting machine comprising means for gathering crop parts from a standing crop and an auger rearwards of the gathering means for conveying the gathered crop parts onwards, said gathering means and auger being spaced apart in the direction of movement of the gathered crop parts between them, transfer means disposed between the gathering means and the auger for urging gathered crop parts towards the auger, said transfer means comprising a pan or platform having a conveying surface with a trailing end extending adjacent to a lower region of the auger, and an opposite, leading end, said trailing end being at a lower level than said leading end, and means connected to said pan or platform for oscillating said conveying surface to drive the crop parts on said pan or platform rearwardly towards the auger, said oscillating means being arranged to oscillate the conveying surface with a horizontal component of movement towards and away from said auger lower region and a vertical component of movement which is greater at the leading end thereof than at the trailing end of said conveying surface.

2. Harvesting machine according to claim 1 wherein said oscillating means are arranged to oscillate said trailing end of the conveying surface substantially in the direction of the adjacent region of the conveying surface.

3. Harvesting machine according to claim 1 wherein said oscillating means are arranged to raise the leading end of the conveying surface during a rearward movement of the oscillation.

4. Harvesting machine according to claim 1 wherein said oscillating means comprises a rocking lever mechanism.

5. Harvesting machine according to claim 1 wherein the conveying surface of the pan or platform has a stepped form comprising a spaced series of downwardly extending faces which are directed rearwards.

6. Harvesting machine according to claim 5 wherein substantially horizontal faces of the conveying surface alternate with said downwardly extending faces.

7. A harvesting machine according to claim 6 wherein said substantially horizontal faces including a rearmost said face which is downwardly inclined in the direction towards the auger.

8. Harvesting machine according to claim 1 having an auger pan comprising a surface extending under the auger and wherein the trailing end of the conveying surface overlaps a front end of said auger pan and is located above the surface of the auger pan in the region of said overlap.

9. Harvesting machine according to claim 8 wherein sealing means are provided between the underside of said overlapping trailing end of the pan or platform and said front end of the auger pan.

10. Harvesting machine according to claim 1 wherein the pan or platform has side walls upwardly extending above said conveying surface.

* * * * *